US012316171B2

(12) United States Patent
Tokuyama et al.

(10) Patent No.: US 12,316,171 B2
(45) Date of Patent: May 27, 2025

(54) INVERTER INTEGRATED MOTOR

(71) Applicant: Hitachi Astemo, Ltd., Hitachinaka (JP)

(72) Inventors: Takeshi Tokuyama, Tokyo (JP);
Takaki Itaya, Hitachinaka (JP);
Masahiro Hori, Tokyo (JP); Takashi Hirao, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 239 days.

(21) Appl. No.: 17/922,850

(22) PCT Filed: Jan. 29, 2021

(86) PCT No.: PCT/JP2021/003173
§ 371 (c)(1),
(2) Date: Nov. 2, 2022

(87) PCT Pub. No.: WO2021/235009
PCT Pub. Date: Nov. 25, 2021

(65) Prior Publication Data
US 2023/0155456 A1 May 18, 2023

(30) Foreign Application Priority Data

May 19, 2020 (JP) ................. 2020-087753

(51) Int. Cl.
*H02K 11/33* (2016.01)
*H02K 3/50* (2006.01)
(Continued)

(52) U.S. Cl.
CPC ............ *H02K 11/33* (2016.01); *H02K 3/50* (2013.01); *H02K 5/203* (2021.01); *H02K 9/19* (2013.01);
(Continued)

(58) Field of Classification Search
CPC .......... H02K 9/19; H02K 11/27; H02K 11/33; H02K 3/50; H02K 5/203; H02K 2203/09;
(Continued)

(56) References Cited

U.S. PATENT DOCUMENTS

2013/0278090 A1 10/2013 Matsuo
2015/0001972 A1 1/2015 Miyama et al.
2019/0229640 A1* 7/2019 Aichriedler ........... H02M 7/003

FOREIGN PATENT DOCUMENTS

JP 2011-250645 A 12/2011
JP 2012-147564 A 8/2012
(Continued)

OTHER PUBLICATIONS

JP2011250645A English translation (Year: 2024).*
(Continued)

*Primary Examiner* — Christopher M Koehler
*Assistant Examiner* — Viswanathan Subramanian
(74) *Attorney, Agent, or Firm* — Foley & Lardner LLP

(57) ABSTRACT

An object of the present invention is to provide an inverter integrated motor that achieves both improvement in cooling performance of a current sensor and downsizing of an entire device. An inverter integrated motor includes: a power module that converts a direct current into an alternating current; a flow path forming body that is formed so as to flow and cover a refrigerant in the power module; an inverter that installs the power module and the flow path forming body inside; a current sensor that detects the alternating current; and a motor that houses a stator and a rotor, wherein the power module is disposed at a position facing a rotation shaft of the motor via the stator and the rotor, and the current sensor 13 is disposed between the flow path forming body and a coil end of the stator when viewed from a direction
(Continued)

perpendicular to the rotation shaft, and at least a part of the current sensor is housed in a motor housing.

6 Claims, 7 Drawing Sheets

(51) Int. Cl.
    *H02K 5/20*           (2006.01)
    *H02K 9/19*           (2006.01)
    *H02K 11/27*         (2016.01)

(52) U.S. Cl.
    CPC ......... *H02K 11/27* (2016.01); *H02K 2203/09* (2013.01)

(58) Field of Classification Search
    CPC .... H02K 2211/03; H02K 5/225; H02K 7/116; Y02T 10/64
    See application file for complete search history.

(56) References Cited

FOREIGN PATENT DOCUMENTS

| | | |
|---|---|---|
| JP | 2019-198175 A | 11/2019 |
| WO | WO-2013/118670 A1 | 8/2013 |

OTHER PUBLICATIONS

International Search Report with English translation and Written Opinion dated Apr. 20, 2021 in corresponding International Application No. PCT/JP2021/003173.

\* cited by examiner

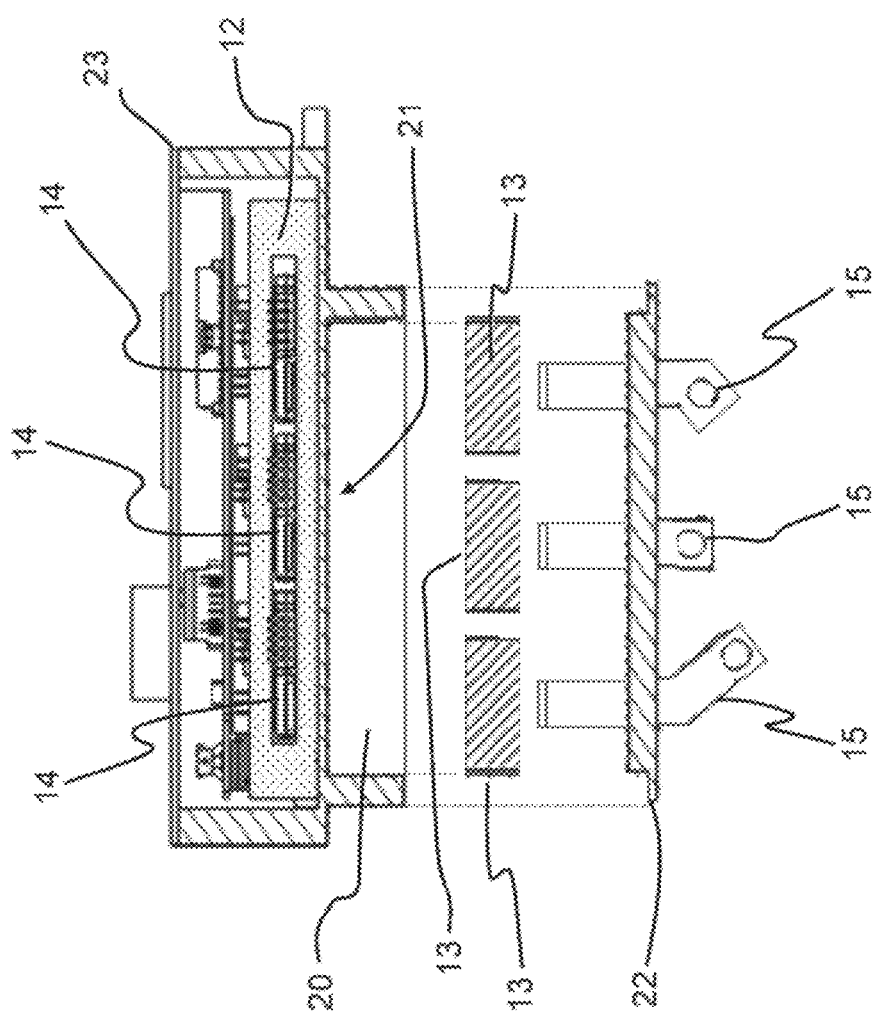

INVERTER INTEGRATED MOTOR

TECHNICAL FIELD

The present invention relates to an inverter integrated motor.

BACKGROUND ART

In an inverter integrated motor in which a motor and an inverter are integrated, there is an increasing demand for further reduction in size and height in order to increase a vehicle interior space and a cruising distance of an electric vehicle (EV). At that time, since downsizing of a device increases a heat generation density, cooling of inverter components having low heat resistance is required. Further, in the reduction in height of the device, there is a problem in terms of motor mountability of the inverter, and a structure in which the inverter is disposed with less unevenness with respect to the motor which is being downsized is required.

As a background art of the present invention, the following PTL 1 is known. PTL 1 discloses an electric circuit device in which a current sensor 304 is embedded in an intermediate member 3 of a rotary electric machine 1, thereby making it possible to suppress an increase in the overall size.

CITATION LIST

Patent Literature

PTL 1: JP 2011-250645 A

SUMMARY OF INVENTION

Technical Problem

In a technique of PTL 1, there is no cooling mechanism of the current sensor 304, and when the current sensor is housed in a motor housing, a sensing error occurs in the current sensor 304 and a problem of poor reliability occurs. In view of this, an object of the present invention is to realize downsizing of an inverter integrated motor while considering cooling of a current sensor.

Solution to Problem

An inverter integrated motor according to the present invention includes: a power module that converts a direct current into an alternating current; a flow path forming body configured to cause a refrigerant to flow through the power module and cover the power module; an inverter in which the power module and the flow path forming body are installed; a current sensor that detects the alternating current; a motor including a stator and a rotor; and a motor housing that houses the stator and the rotor, wherein the power module is disposed at a position facing a rotation shaft of the motor via the stator and the rotor, and the current sensor is disposed between the flow path forming body and a coil end of the stator when viewed from a direction perpendicular to the rotation shaft, and at least a part of the current sensor is housed in the motor housing.

Advantageous Effects of Invention

According to the present invention, it is possible to provide an inverter integrated motor that achieves both improvement in cooling performance of a current sensor and downsizing of the entire device.

BRIEF DESCRIPTION OF DRAWINGS

FIG. 7 is a diagram for explaining a joint part between an inverter and a motor in FIG. 6.

DESCRIPTION OF EMBODIMENTS

Figure 1:
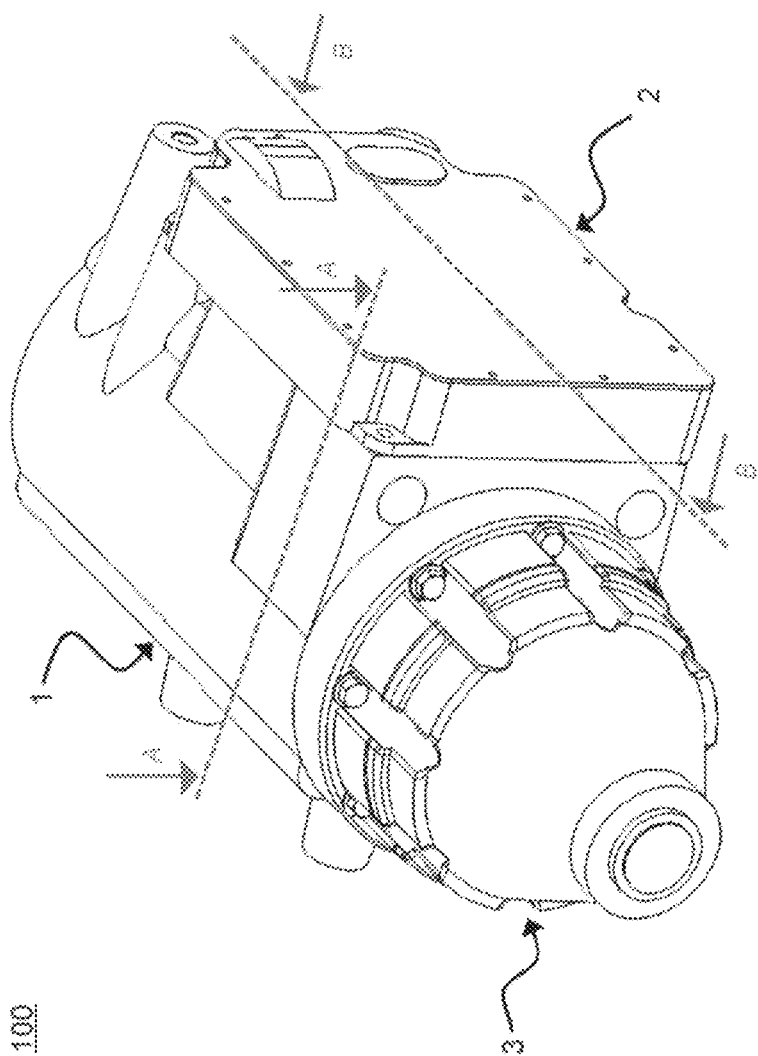
FIG. 1 is an overall perspective view of an inverter integrated motor according to an embodiment of the present invention.

Hereinafter, embodiments of the present invention will be described with reference to the drawings. Note that each of the embodiments is an example for describing the present invention, and omission and simplification are appropriately made for clarity of description. The present invention can be implemented in various other forms. Unless otherwise specified, each component may be singular or plural. Further, the position, size, shape, range, and the like of each component illustrated in the drawings may not represent the actual position, size, shape, range, and the like in order to facilitate understanding of the invention. Therefore, the present invention is not necessarily limited to the position, size, shape, range, and the like disclosed in the drawings.

(Configuration of inverter integrated motor) FIG. 1 is an overall perspective view of an inverter integrated motor according to an embodiment of the present invention. Note that the B-B disconnection is used in the description of FIG. 5, and the A-A disconnection is used in the description of FIG. 6.

An inverter integrated motor 100 includes a motor 1, an inverter 2, and a gear box 3.

The inverter integrated motor 100 has a mechanism in which a rotation shaft of the motor 1 and a shaft on a side of an input of the gear box 3 are mechanically connected to each other, a rotation speed of the motor 1 is reduced, and torque is transmitted from a shaft on a side of an output of the gear box 3 to an axle of a vehicle. Note that a reduction ratio at this time is determined by the number of teeth of a plurality of gears incorporated in the gear box 3, and generally takes a value of about 8 to 18.

Figure 2:
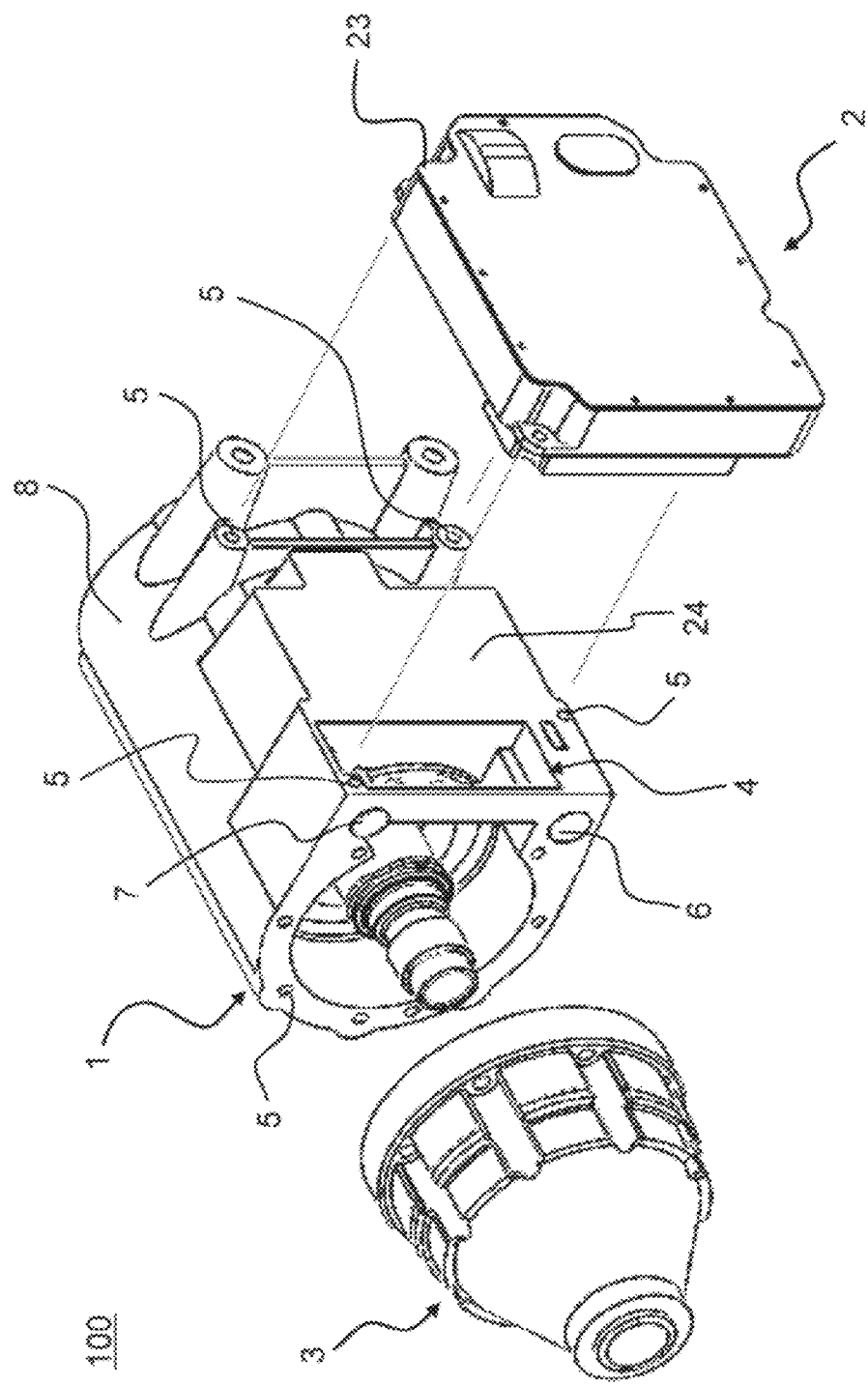
FIG. 2 is an exploded view of FIG. 1.

FIG. 2 is an exploded view of the inverter integrated motor 100 of FIG. 1.

A motor flow path inlet 6 and a motor flow path outlet 7 are formed on a surface of a motor housing 8. The motor flow path inlet 6 and the motor flow path outlet 7 serve as inlets and outlets for a refrigerant flowing into the motor housing 8.

The inverter 2 is fastened to be in contact with an inverter mounting surface 24 of the motor 1 by an assembling fixing part 5 provided in the motor housing 8. Similarly, the gear box 3 is also fastened to the motor 1 by the assembling fixing part 5 provided in the motor housing 8. A heat generated in the inverter 2 is dissipated to the refrigerant flowing inside the motor 1 by this fastening.

The motor housing 8 includes a current sensor housing part 4 for housing a current sensor 13 (described later) attached to an inverter enclosure 23 when the inverter 2 and the motor 1 are integrated. Details will be described later.

Figure 3:
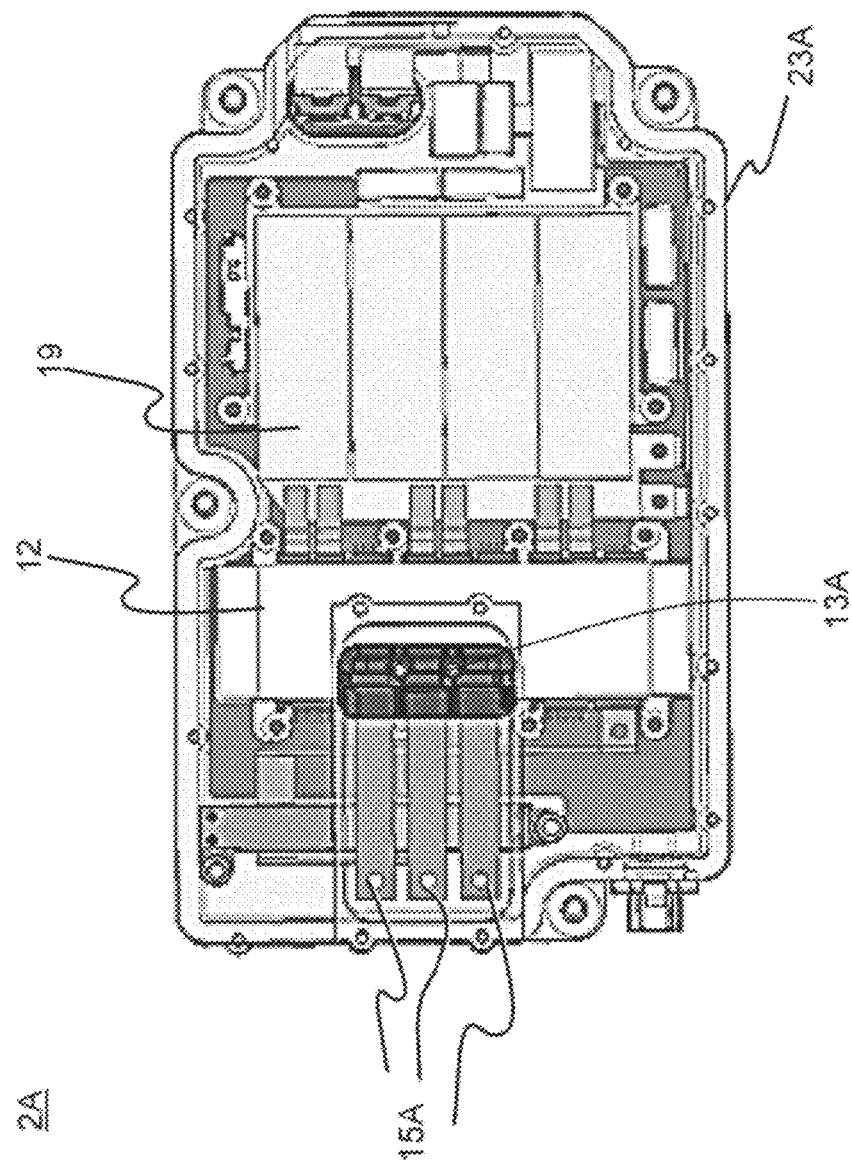
FIG. 3 is a diagram for explaining an internal structure of a conventional inverter.

FIG. 3 is a diagram for explaining an internal structure of a conventional inverter 2A.

The inverter 2A includes a power module 14 (described later) in which a power semiconductor switch such as an IGBT or a diode for converting DC power into AC power is mounted and incorporated, a flow path forming body 12 for causing a refrigerant to flow through the power module 14 and cooling the power module, a capacitor 19 for smoothing a DC ripple voltage generated in a DC voltage at the time of power conversion, a current sensor 13A for detecting an AC current, AC bus bars 15A, a control board, and an EMC filter (unsigned). These constituent components of the inverter 2A are incorporated in an inverter enclosure 23A to form a main circuit of a three-phase inverter. Note that the flow path forming body 12 is formed so as to cover the power module 14.

The inverter 2A includes the AC bus bars 15A for three phases in order to electrically connect the capacitor 19 and the power module 14 to the motor 1 described above, and the AC bus bars 15A are output from the inverter enclosure 23A to the outside. Each of the three-phase AC bus bars 15A includes a current sensor 13A. Note that a DC connector (unsigned) is also output from the inverter enclosure 23A in addition to the AC bus bars 15A.

In order to perform vector control, the current sensor 13A detects three-phase AC current values of the motor 1 and feeds them back to a motor controller (not illustrated). Further, since the current sensor 13A has a threshold of a predetermined heat-resistant allowable temperature, when the current sensor 13A operates in a high temperature environment exceeding the threshold of the temperature, a detection error occurs. Note that the predetermined heat-resistant allowable temperature is, for example, 125° C.

Figure 4:
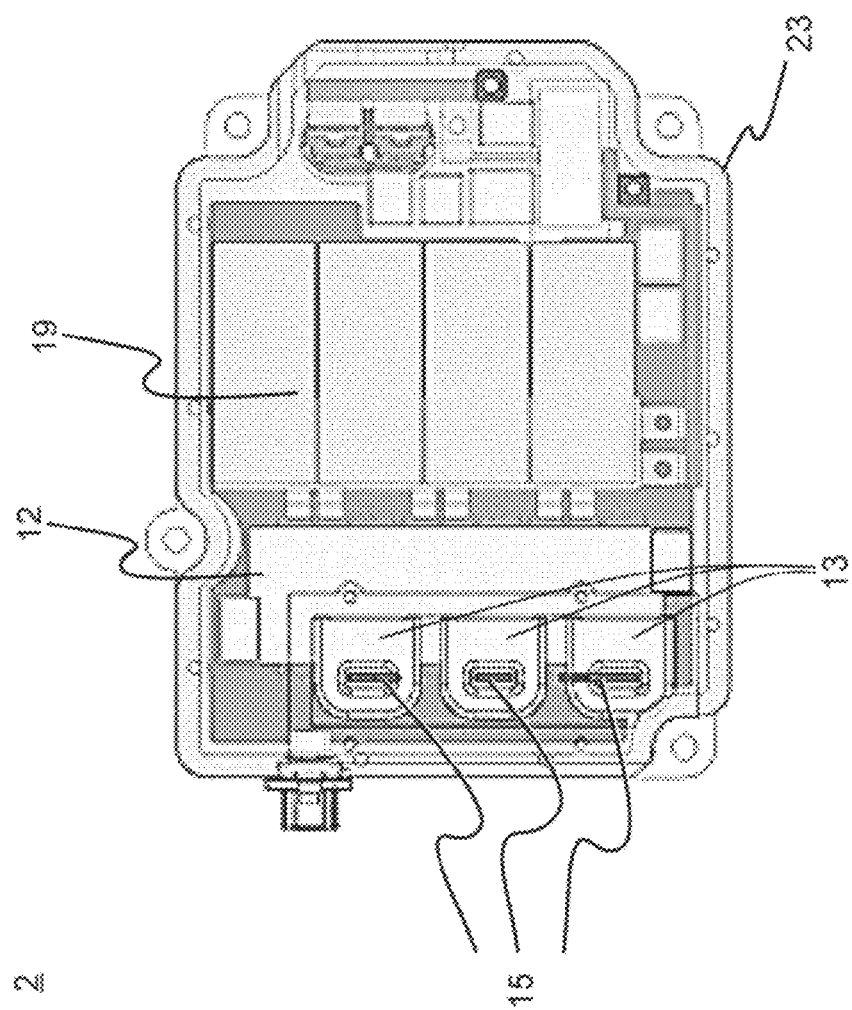
FIG. 4 is a diagram for explaining an internal structure of an inverter of the present invention.

FIG. 4 is a diagram for explaining an internal structure of the inverter 2 according to an embodiment of the present invention.

Current sensors 13 are formed so as to surround AC bus bars 15 in a circumferential direction, and an insulating resin is provided between each of the current sensors and each of the AC bus bars 15. As a result, each of the current sensors 13 is non-contact current sensor 13 that is not in contact with each of the AC bus bars 15.

In the inverter 2, as compared with the conventional inverter 2A, each of the AC bus bars 15 does not extend along the inverter 2, but extends in a direction of the motor 1, which is a lower direction (back side in the drawing) of the inverter 2. Therefore, a volume of the inverter enclosure 23 is smaller than that of the conventional inverter enclosure 23A by an amount that each of the AC bus bars 15 does not extend.

Further, along with this, each of the current sensors 13 can also be installed between the inverter 2 and the motor 1 in accordance with an extending direction of the AC bus bars 15 without being installed on an upper part (a front side in the drawing) of the flow path forming body 12. More specifically, each of the current sensors 13 is installed on an opposite surface of the inverter enclosure 23 via an installation surface of the flow path forming body 12. Therefore, downsizing and height reduction of the inverter 2 can be realized.

Figure 5:
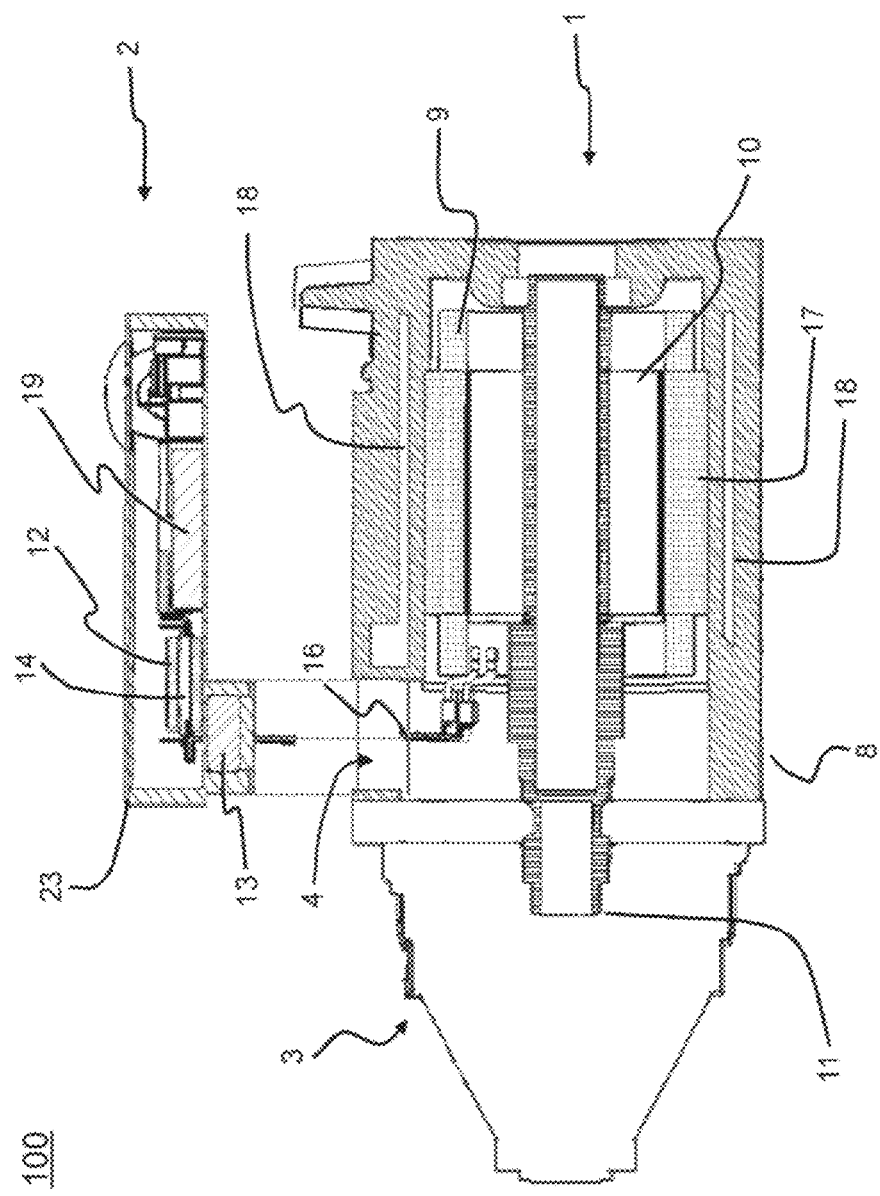
FIG. 5 is a cross-sectional view taken along line B-B of FIG. 1.

FIG. 5 is a cross-sectional view of the inverter integrated motor 100 of FIG. 1 taken along line B-B.

The motor 1 has a configuration in which a rotor 10 and a stator (stator core) 17 are housed in the motor housing 8. The rotor 10 has a rotation shaft 11, and is connected to a shaft on the side of the input of the gear box 3 to transmit torque. The rotor 10 rotates inside the stator core 17, and power is supplied to the motor 1 by a coil formed around the stator core 17 in an axial direction.

A coil end 9, which is an end part of the coil, is formed in the coil formed in the stator core 17. A motor cable 16 for connection with the inverter 2 is output from the coil end 9.

The current sensor housing part 4 is provided in the motor housing 8 by using a space excluding the rotor 10, the stator 17, and the rotation shaft 11. When the inverter 2 is coupled to the motor 1, the inverter 2 is fixed such that an attachment part of the current sensor 13 is fitted into the current sensor housing part 4 provided in the motor 1. As a result, the current sensor housing part 4 houses the current sensor 13 in the motor housing 8 of the motor 1.

Here, since the current sensor 13 needs to be cooled by the flow path forming body 12 of the power module 14, the current sensor is disposed at a position sandwiched between the coil end 9 and the flow path forming body 12 in the motor housing 8. As a result, at least a part of the current sensor 13 is housed in the motor housing 8, high density mounting is achieved, and the fixability can be also enhanced.

The power module 14 and the flow path forming body 12 have a positional relationship facing the motor rotation shaft 11 with the current sensor 13 interposed therebetween. As a result, a length of a wiring of the AC bus bar 15, which is an alternating-current wiring between the motor 1 and the inverter 2, is shortened. This achieves downsizing and height reduction of the inverter integrated motor 100.

In summary, the power module 14 is disposed at a position facing the rotation shaft 11 of the motor 1 via the stator 17 and the rotor 10. Further, the current sensor 13 is disposed between the flow path forming body 12 and the coil end 9 of the stator 17 when viewed from a direction perpendicular to the rotation shaft 11. As a result, at least a part of the current sensor 13 is housed in the motor housing 8.

The flow path of the motor 1 will be described. The motor 1 causes a refrigerant for cooling the entire device to flow from the motor flow path inlet 6 described above, and causes the refrigerant to flow to the flow path forming body 12 and a motor flow path 18, which are continuous flow paths. That is, the refrigerant flowing in the motor flow path 18 also flows to the flow path forming body 12 for cooling the power module 14 built in the inverter 2, and the refrigerant is shared by the motor 1 and the inverter 2. The refrigerant that has flowed through the flow path forming body 12 and the motor flow path 18 is discharged from the motor flow path outlet 7 described above to the outside of the inverter integrated motor 100. Such a refrigerant circulation structure enables cooling of the motor 1 and the inverter 2.

The flow path forming body 12 that cools the power module 14 can cool the current sensor 13 and an air layer in a space around the current sensor 13. Therefore, even when the inside of the motor housing 8 is in a high-temperature environment higher than or equal to the heat-resistant temperature of the current sensor 13, the disposed current sensor 13 is cooled by the refrigerant flowing in the motor flow path 18, and the temperature of the current sensor 13 can be maintained at a temperature lower than a predetermined allowable heat-resistant temperature. This makes it possible to reduce a detection error of the current sensor 13 and improve reliability. Note that the temperature of the refrigerant is, for example, 70° C. or lower.

Further, with the above configuration, a capacitor 19 disposed in the inverter 2 is also indirectly cooled from the motor housing 8 via the inverter enclosure 23 in addition to a cooling effect from the flow path forming body 12, thereby improving the cooling performance. Thus, the inverter integrated motor 100 can operate with high accuracy and high reliability.

This eliminates the need for the inverter 2 to extend the inverter enclosure 23 to dispose the current sensor 13 and the AC bus bar 15. Further, since an inner wall of the current sensor housing part 4 is close to the flow path forming body 12 of the inverter 2 and the motor flow path 18, the current sensor housing part 4 has a structure capable of performing heat transfer with respect to the surrounding inner wall. Therefore, it is possible to realize the inverter integrated motor 100 with improved cooling performance as well as downsizing of the inverter 2.

Figure 6:
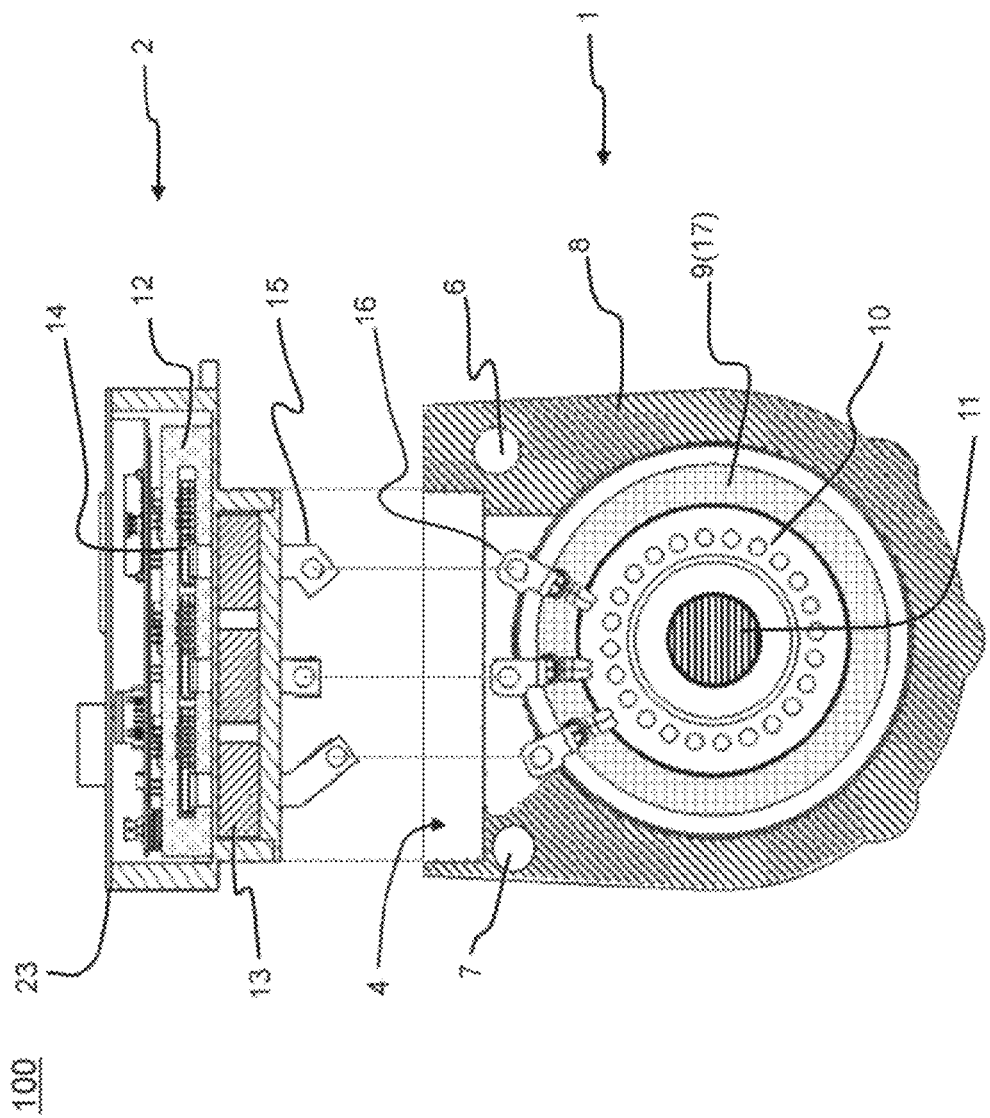
FIG. 6 is a cross-sectional view taken along line A-A of FIG. 1.

FIG. 6 is a cross-sectional view of the inverter integrated motor 100 of FIG. 1 taken along line A-A.

The AC bus bar 15 penetrates the current sensor 13 in which a hole is formed at a center part, and the penetrating part is made of an insulating resin. As a result, the current sensor 13 is a non-contact sensor. Further, when the inverter 2 and the motor 1 are integrated, the AC bus bar 15 is connected to the motor cable 16 of the motor 1 when the current sensor 13 is housed in the current sensor housing part 4. As a result, the current sensor housing part 4 improves the positioning of the current sensor 13 and the AC bus bar 15.

At this time, the motor flow path 18 and a flow path of the flow path forming body 12 are also connected, and the refrigerant flowing inside the respective flow paths is shared as described above. As a result, the thermal resistance between the current sensor 13 and the flow path forming body 12 can be reduced.

With such a configuration, a connection wiring length constituted by the AC bus bar 15 of the inverter 2 and the motor cable 16 can be significantly shortened, and a volume of the inverter 2 can also be reduced. Further, the current sensor 13 is cooled not only by a surface of the flow path forming body 12 but also by the motor flow path 18, and can be operated with high accuracy and high reliability even inside the motor housing 8 in a high-temperature environment, and sensing accuracy and reliability can be secured.

FIG. 7 is a diagram for explaining a joint part between the inverter 2 and the motor 1 in FIG. 4.

In the current sensor 13, three-phase currents corresponding to the AC bus bar 15 are attached to the current sensor attachment part 20, and at least a part of the current sensor 13 is in contact with and fixed to a current sensor cooling surface 21. As a result, the current sensor 13 is cooled by the flow path forming body 12, and the temperature of the current sensor 13 can be maintained at a predetermined allowable temperature or less.

The current sensor attachment part 20 is provided on a surface of the inverter enclosure 23 opposite to the flow path forming body 12, and attaches the current sensor 13. Further, the current sensor attachment part 20 is sealed by a lid body 22 in order to enhance the fixability of the current sensor.

The AC bus bar 15 connected to the power module penetrates the lid body 22, and the AC bus bar 15 is connected to the motor. Further, as described above, when the inverter 2 and the motor 1 are integrated, the current sensor attachment part 20 is fitted with the housing part 4 formed in the motor housing 8 for housing the current sensor 13.

With such a configuration, the current sensor 13 is thermally protected from a high-temperature environment inside the motor 1 and the oil of the gears in the gear box 3. Note that the current sensor 13 may be a coreless sensor. In that case, it is necessary to cool a sense IC and a shield member. The coreless sensor is also basically a non-contact sensor, and is disposed in cooperation with the AC bus bar 15 of the inverter 2.

According to the first embodiment of the present invention described above, the following operational effects are achieved.

(1) An inverter integrated motor 100 includes: a power module 14 that converts a direct current into an alternating current; a flow path forming body 12 configured to cause a refrigerant to flow through the power module 14 and cover the power module 14; an inverter 2 in which the power module 14 and the flow path forming body 12 are installed; a current sensor 13 that detects the alternating current; and a motor 1 including a motor housing 8 that houses a stator 17 and a rotor 10. The power module 14 is disposed at a position facing a rotation shaft 11 of the motor 1 via the stator 17 and the rotor 10. The current sensor 13 is disposed between the flow path forming body 12 and a coil end 9 of the stator 17 when viewed from a direction perpendicular to the rotation shaft 11, and at least a part of the current sensor 13 is housed in the motor housing 8. With this configuration, it is possible to provide the inverter integrated motor 100 that achieves both cooling performance and downsizing of the inverter 2.

(2) The current sensor 13 of the inverter integrated motor 100 is installed on an opposite surface of an enclosure 23 of the inverter 2 via an installation surface of the flow path forming body 12. Thus, the inverter 2 is downsized.

(3) The current sensor 13 of the inverter integrated motor 100 is installed in an attachment part 20 formed in the enclosure 23 of the inverter 2 for attaching the current sensor 13, and the attachment part 20 is fitted with a housing part 4 formed in the motor housing 8 for housing the current sensor when the inverter 2 and the motor 1 are integrated. This configuration contributes to downsizing of the inverter integrated motor 100 while improving the fixability of the current sensor 13.

(4) In the inverter integrated motor 100, the attachment part 20 is sealed by a lid body 22, and an AC bus bar 15 connected to the power module 14 penetrates the lid body 22 and is connected to the motor 1. With this configuration, the fixability of the current sensor 13 is enhanced.

(5) In the inverter integrated motor 100, the current sensor 13 is not in contact with the AC bus bar 15. With this configuration, it is possible to reduce the space required for disposing the current sensor 13 while adopting the non-contact type.

(6) In the inverter integrated motor 100, the current sensor 13 is a coreless current sensor. With this configuration, even if another type of current sensor is adopted, a similar effect can be obtained.

Note that the above description is merely an example, and when interpreting the invention, there is no limitation or restriction on the correspondence between the matters described in the above embodiment and the matters described in the claims. Further, deletion, replacement with another configuration, and addition of another configuration can be performed without departing from the technical idea of the invention, and an aspect thereof is also included in the scope of the present invention.

REFERENCE SIGNS LIST 100 inverter integrated motor
1 motor 2 inverter
3 gear box
4 current sensor housing part
5 fixing part
6 motor flow path inlet
7 motor flow path outlet
8 motor housing
9 coil end
10 rotor
11 rotation shaft
12 flow path forming body
13, 13A current sensor
14 power module
15, 15A AC (alternating current) bus bar
16 motor cable
17 stator (stator core)
18 motor flow path
19 capacitor
20 current sensor attachment part
21 current sensor cooling surface
22 lid body of current sensor housing part
23, 23A inverter enclosure
24 inverter mounting surface

The invention claimed is:

1. An inverter integrated motor comprising:
a power module that converts a direct current into an alternating current;
a flow path forming body surrounding the power module and configured to allow a refrigerant to flow through the power module and surround a plurality of sides of the power module;
an inverter comprising an enclosure that houses the power module and the flow path forming body, wherein the power module and the flow path forming body are installed as parts of the inverter;
a current sensor that detects the alternating current and is installed on the enclosure via the flow path forming body;
a motor including a stator and a rotor configured to rotate inside the stator, wherein the motor receives power supplied from a coil formed around the stator;
a motor housing that houses the stator and the rotor and comprising (i) a housing part to house and surround at least a part of the current sensor when the inverter is coupled to the motor, and (ii) a motor flow path positioned adjacent to a side of the housing part, extending in an axial direction, and configured to allow the refrigerant to flow to the flow path forming body; and
a plurality of AC bus bars extending in a direction towards the motor,
wherein
the enclosure comprises a protruded portion housing the current sensor, the protruded portion configured to fit into the housing part,
the plurality of AC bus bars extend from the protruded portion of the enclosure to couple with a plurality of cables of the motor exposed via the housing part,
the power module is disposed at a position facing a rotation shaft of the motor via the stator and the rotor,
the current sensor is interposed between the flow path forming body and a coil end of the coil formed around the stator when viewed from a direction perpendicular to the rotation shaft,
the motor flow path and the flow path forming body form a continuous flow path, and
the motor causes the refrigerant to flow between the motor and the inverter via the continuous flow path.

2. The inverter integrated motor according to claim 1, wherein the current sensor is installed on a surface of the enclosure that faces towards the motor.

3. The inverter integrated motor according to claim 2, wherein
the current sensor is installed in an attachment part formed in the enclosure of the inverter, the attachment part forming the protruded portion of the enclosure, and
the attachment part is fitted with the housing part that is formed in the motor housing and houses the current sensor when the inverter and the motor are integrated.

4. The inverter integrated motor according to claim 3, wherein
the attachment part is sealed by a lid body, and
at least one of the plurality of AC bus bars connected to the power module penetrates the lid body and is connected to the motor.

5. The inverter integrated motor according to claim 4, wherein the current sensor is not in contact with the plurality of AC bus bars.

6. The inverter integrated motor according to claim 5, wherein the current sensor is a coreless current sensor.

* * * * *